United States Patent [19]

Pegg

[11] 4,223,728

[45] Sep. 23, 1980

[54] METHOD OF OIL RECOVERY FROM UNDERGROUND RESERVOIRS

[75] Inventor: David R. Pegg, Ojai, Calif.

[73] Assignee: Garrett Energy Research & Engineering Inc., Ojai, Calif.

[21] Appl. No.: 964,880

[22] Filed: Nov. 30, 1978

[51] Int. Cl.² .................................................. E22B 43/22
[52] U.S. Cl. .................................... 166/266; 166/267; 208/157
[58] Field of Search ............... 166/266, 267, 268, 272, 166/303, 275; 208/107, 108, 157

[56] References Cited

U.S. PATENT DOCUMENTS

| | | | |
|---|---|---|---|
| 1,894,759 | 1/1933 | DeGroote | 166/275 |
| 2,396,109 | 3/1946 | Martin | 208/157 X |
| 2,885,002 | 5/1959 | Jenks | 166/245 |
| 2,895,904 | 7/1959 | Jones et al. | 208/157 X |
| 2,905,629 | 9/1959 | Smith et al. | 208/157 X |
| 2,908,634 | 10/1959 | Stratford | 208/157 X |
| 2,917,451 | 12/1959 | Leffer | 208/107 X |
| 2,989,461 | 6/1961 | Eastman | 208/107 |
| 3,228,467 | 1/1966 | Schlinger et al. | 166/266 |
| 3,467,191 | 9/1969 | Van Daalen et al. | 166/269 |
| 3,838,737 | 10/1974 | Allen et al. | 166/269 |
| 3,845,821 | 11/1974 | Allen et al. | 166/269 |
| 3,923,635 | 12/1975 | Schulman et al. | 208/157 X |
| 3,941,681 | 3/1976 | Saegusa et al. | 208/107 |

Primary Examiner—Stephen J. Novosad
Assistant Examiner—George A. Suchfield
Attorney, Agent, or Firm—Kenneth J. Hovet

[57] ABSTRACT

Oil is recovered from underground reservoirs using hydrocarbons produced from cracking equipment located near the site. The equipment is operated at pressures proximate existing underground formation pressure to produce hydrocarbons for direct injection into the formation with reduced or no further compression. The hydrocarbons are injected at selected locations in the reservoir to pressurize the field, effectively reduce the oil viscosity and cause its flow into production wells. Specialized field cracking equipment, such as units for simple, small scale, low fouling operation that circulate heavy coke slurries, may be used to produce the hydrocarbons for injection.

23 Claims, 5 Drawing Figures

METHOD OF OIL RECOVERY FROM UNDERGROUND RESERVOIRS

BACKGROUND OF THE INVENTION

1. Field of the Invention

The present invention relates to the recovery of oil and, more particularly, to a system for the treatment and extraction of crude oil from subterranean oil formations.

2. Description of the Prior Art

It is well known that most oil recovery techniques recover only a small portion of the actual oil present in a given oil-bearing formation. For this reason there is a great deal of interest in developing techniques which permit the recovery of the remaining quantities of oil. Generally, these techniques utilize various flushing or pressurizing methods which augment the oil formation pressure through one or more injection wells within a reasonable proximity to one or more producing wells.

The flushing or pressurizing fluids may take the form of steam, hot gas, water, water with surface active, thickening or other agents, carbon dioxide and various types of solvent solutions. One purpose for injecting such fluids is to reduce the surface tension of the tightly-bound oil adhering to the particles of the oil-bearing structure. Another purpose is to merely flush out or displace the oil between the formation pores. The injection of gas or other fluids alone, however, is usually only partially effective. Also, such injection fluids are relatively expensive and require facilities for preparation and/or transportation to the oil field. Additionally, prior art injection systems require extensive pressurization and/or injection equipment. Only water alone is practical on a widespread basis, and its ability to increase yield is low. Other methods are either not, or only marginally economical at the present time.

One of the more potentially productive oil recovery processes is to use "miscible" fluids. U.S. Pat. No. 2,412,765 describes the injection of light hydrocarbons comprising mainly propane and butane into depleted oil reservoirs at the reservoir pressure. Similarly, U.S. Pat. Nos. 2,297,832 and 2,724,438; 2,880,801 and 3,223,157 disclose processes treating oil formations with residue gases and hydrocarbons, which may be flashed from the recovered crude oil or purchased from outside sources.

Each of the above patents, however, suffer from the disadvantage that the light hydrocarbons have a tendency to channel and short-circuit through the formation rather than becoming inimately mixed with the crude oil present. The purchase of the light hydrocarbons is also very expensive, and most oil fields, especially depleted ones, have very little light hydrocarbons in the oil. Additionally, the injection of such light hydrocarbons generally requires the addition of expensive storage and compression equipment to effect injection to the reservoir.

As a means for reducing the purchase cost and perhaps diminishing the retentive forces holding the oil within the pores of the formation, two-stage injection processes have been developed such as that shown in U.S. Pat. Nos. 2,347,769, 2,609,051 and 3,780,808. The above patents utilize a hydrocarbon gas followed by an injection of gas or water. This reduces the amount of light hydrocarbons needed, but is very difficult to control, and seldom obtains much increase in oil production.

In the 3,780,808 patent, a water/hydrocarbon colloidal silica mixture, which is partially miscible with the formation oil, is injected to increase the viscosity of the flushing fluid, thus facilitating the flow of the formation oil into production wells. Numerous other patents also propose a similar use of additives to the water or oil.

It is clear that a major disadvantage of the above-described miscible fluid and other processes, resides in the high cost of the light hydrocarbons or the additives, transporting them to the oil field, including the provision for storage, water treatment and the necessity of powerful injection equipment. Additionally, none of the patentees contemplated the use of cracking equipment, operating at high pressure, located at the site for producing injection fluids and other desirable hydrocarbons from the formation's oil or by treating purchased inexpensive oil. Conventional crackers are so large, expensive, and complex to operate that it has never been considered possible to have them operate in the oil field area.

SUMMARY OF THE INVENTION

The present invention discloses a system for recovering oil from an oil formation which utilizes simple, low-fouling, small-scale cracking equipment operating at near reservoir pressure adjacent to the formation for producing hydrocarbons which are utilized for direct injection into the formation and causing flow of oil into production wells. The injected hydrocarbons are produced at the site from oil flowing from the production wells or from the on-site treatment of inexpensive residual, heavy, or other oil from external sources. The cracking equipment operates at high pressures to either obviate or significantly reduce the need for auxilliary compressors, pumps, and the like.

The invention further comprehends the use of specialized cracking units and the predetermined location of one or more injection wells near one (it could be the same) or more production or withdrawal wells in a manner to optimize the removal and recovery of oil from the formation regardless of whether the formation is new or older and substantially depleted. The injection and production wells may be interchangeable and one well may function as both simultaneously.

Hydrocarbons recovered from the cracking equipment may be separated to yield intermediate hydrocarbons having predominately four to ten carbon atoms for use in extracting heavy crude oil deposits. Such intermediate hydrocarbons may be initially injected into the formation either beneath an injection of lighter hydrocarbons or at the base of the formation to reduce the viscosity of the crude oil. A primary injection of mixed or light hydrocarbons obtained from the cracking unit is injected into an upper portion of the oil formation to pressurize the formation and cause a flow of the oil into the production wells. The light hydrocarbons generally comprise methane, ethane, propane and butane gases, but can be a mixture of hydrocarbons having predominantly ten or less carbon atoms which is injected as a liquid or a vapor which condenses in the formation. For purposes of the present invention, the term "predominantly" means at least about fifty weight percent of the total weight of the hydrocarbon stream.

The cracking equipment may include novel cracking means operating at about 2–1000 barrels per day in conjunction with hydrocarbon separation means such as distillation columns, heat exchangers or condensers, and phase separator units. In this way, the cracked product may be split into light and intermediate distillate fractions as noted above, which may be recovered as valuable product or separately or as a mixture injected directly into the oil formation.

DESCRIPTION OF THE PREFERRED EMBODIMENTS

Figure 1:
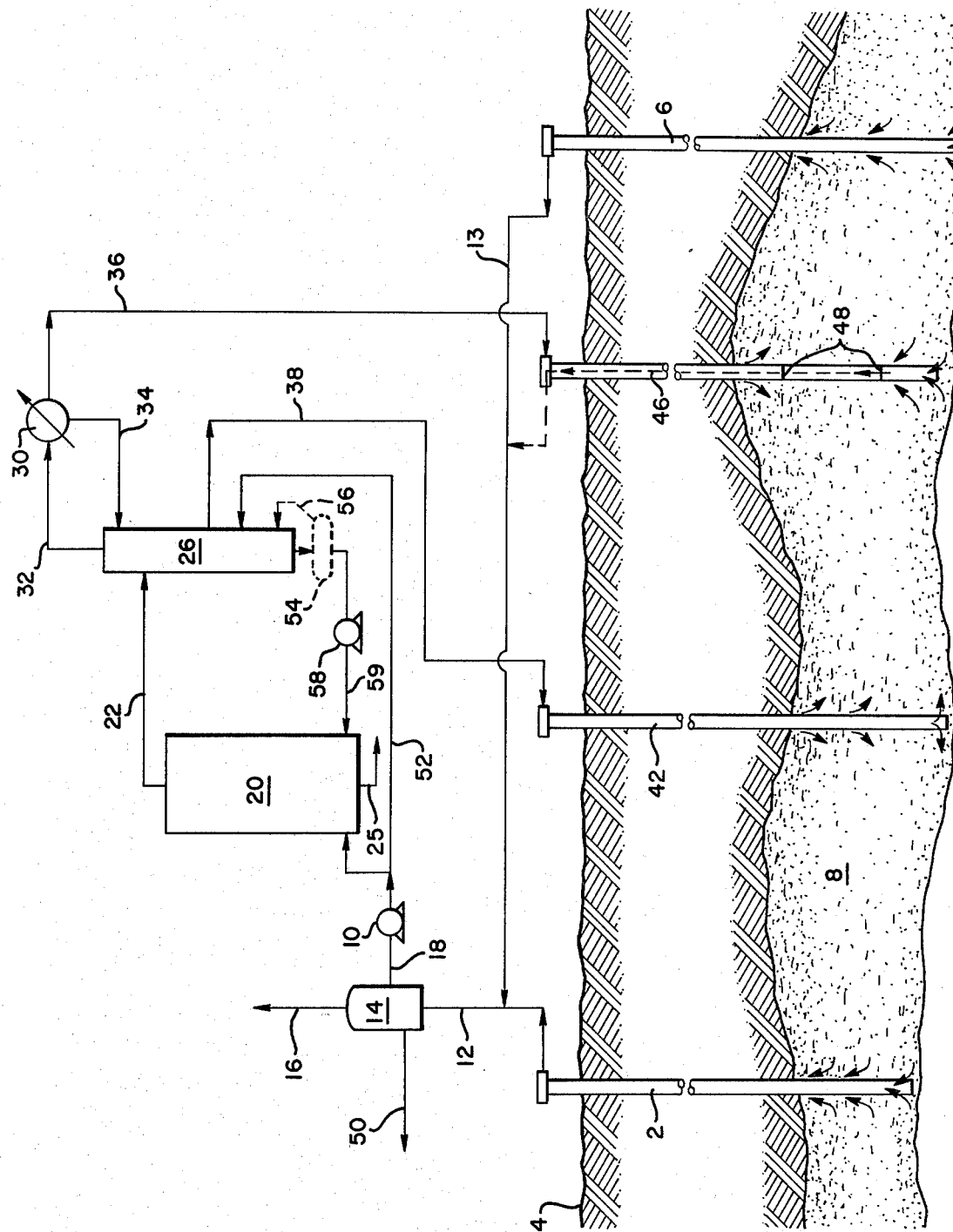

A highly simplified diagrammatic illustration of one form of the invention is shown in FIG. 1 of the accompanying drawings.

Other novel cracking and separation systems for field operation contemplated as coming within the scope of the invention are shown in FIGS. 2a-2d.

RECOVERY SYSTEM

Production or withdrawal wells (2,6) extend below ground level (4) into the oil formation (8). The production wells remove crude oil from the formation and transport it through feed lines (12,13) into phase separator (14).

It is expected that the crude oil will contain entrained or dissolved gases which, if in excess, are preferably separated from the crude oil feed stream and removed from the system through line (16). If water is also present in the crude oil, the separator will function to remove it through line (50). Such water may be discarded or used in subsequent processing or cooling systems. The separated curde oil feed, which may also contain previously injected hydrocarbons, flows to cracker (20) through line (18) or to the separation means (26) through line (52). Since the field cracking equipment will be designed to operate at about 200-2000 psig, pump (10) is located in line (18) to pressurize the feed stream as needed, to the desired operating pressure.

The cracking unit preferably operates to thermally crack the crude oil feed into an overhead stream (22) containing light and intermediate hydrocarbons. Coke circulating in the cracker, in a manner to be hereinafter described, is removed through exit line (25) and burned as the units' heat source. Alternately, the cracker may crack the crude oil with the use of an effective amount of catalysts well known in the art, in which case more of the desired lighter hydrocarbons may be produced.

The cracker overhead vapors travel through line (22) into separation means (26) which may comprise one or more, or a combination of, a distillation column, heat exchangers, and separator including a condenser shown by reference numeral (30). It is anticipated that the specific separation means chosen will be conventional in design except for the ability to operate at 200-2000 psig. Each particular item will also be dependent on the type of cracker being used and the flow volume of vapors through line (22) and return liquors through (34). In some cases it will be desired to separate hydrocarbons having predominately one to four carbon atoms for injection through line (36) from normally liquid intermediate hydrocarbons having predominately from four to eight carbon atoms for injection through line (38). Of course, it can be appreciated that by proper adjustment of the separation means and condenser, line (36) may transport a mixture of both light and intermediate hydrocarbons.

The liquid intermediate hydrocarbons may be processed by well-known means forming no part of this invention to further recover valuable $C_6$ and other fractions or they may be accumulated in storage for later use or they may be injected directly into the oil formation (8) through injection well (42). Preferably, the intermediate distillate injection takes place in the lower portion of the formation to facilitate good contact with heavier crude oil, such as oil having less than 20 API gravity. Alternately, the intermediate hydrocarbons may be injected through wells having outlets located at the mid or upper sections thereof. The overall purpose is to permit a dilution of the oil, with the concomittant reduction in retentive forces holding such in the formation pores.

The light hydrocarbons are transported through injection well (46) into the formation (8). Preferably, the light hydrocarbons are injected into the upper portion of the formation so that they may operate to pressurize the oil strata and displace the oil in the formation toward the production wells (2) and (6). Since the light hydrocarbons are miscible with the crude oil, they also function to further decrease the oil viscosity and thereby assist in diminishing the formation retentive forces. Such light hydrocarbons may be injected in gaseous form provided the existing oil formation pressure is not too high. In this manner the vapors will become condensed within the formation as a result of the pressure existing therein whereby the heat of condensation will further enhance the reduction of oil viscosity. If the light hydrocarbons are injected as liquids, the hydrostatic head through the well greatly assists in overcoming the existing down-hole formation pressure.

It will be understood that the producer wells should be in close proximity to the injection wells and if several are utilized, it is desirable to surround or form a periphery about the injection wells. It will also be understood that the injection wells and producer wells may be utilized interchangeably to inhibit any short-circuiting of the injected hydrocarbons which may occur. A single well such as well (46) with known packer rings, shown as (48) may also be used for both injection and withdrawal.

Examples of the recovery system of the present invention will now be described.

EXAMPLE A

Crude oil being pumped from a partially depleted 1500 foot deep reservoir at two barrels per day per well had an API gravity of 16. It was thermally cracked at 500 psig and 1200° F. to produce an overhead product analyzing:

| | |
|---|---|
| $C_1$–$C_3$ | 30% |
| $C_4$–$C_8$ | 65% |
| $C_9$ & heavier | 5% |
| | 100% |

A predominately $C_4$–$C_8$ product was recovered as a liquid phase from the condenser and injected into the lower zone of the reservoir. A nominal $C_1$–$C_3$ product was injected directly from the condenser into the upper zone of the reservoir. At the end of a one-month period, the reservoir pressure had become reestablished and the flow rate on the adjacent wells increased from two barrels per day to ten barrels per day.

EXAMPLE B

A largely depleted oil field was pumping 22° API oil from a 3500 foot deep reservoir at the rate of 2.3 barrels per day per well. Upon sending its product to a circulating slurry cracker operating at 750 psi and 1250° F., the following products were flashed from the partial condenser following the cracker (see FIG. 2b):

| | |
|---|---|
| $C_1$–$C_3$ | 65% |
| $C_4$–$C_6$ | 30% |
| $C_7$ & heavier | 5% |
| | 100% |

This material was injected into the reservoir as a vapor with no further compression. By the end of three months the field pressure was partially reestablished, and the field was flowing at about ⅓ its original pumping rate. It appeared from preliminary indications that the reservoir recovery would raise from 30% to over 75% of the total oil present.

EXAMPLE C

A small depleted oil reservoir was presumed to have 100,000 barrels of oil left. By processing six barrels of oil per day in accordance with the present invention, there would be 0.1589 (1.753) lb gas/min injected for 0.23 gpm crude feed. The average molecular weight was 30, and the reservoir at 100° F., 500 psia.

$$\underbrace{\frac{.1589(1.753)(10.71)(560)}{30(500)}}_{\text{ft}^3/\text{min gas injected}} - \underbrace{\frac{.23}{7.48}}_{\text{crude out}} = .08063 \text{ ft}^3/\text{min net flow}$$

Reservoir total volume:

$$\frac{0.1(10^6)(42)}{7.48} = 0.561(10^6)\text{ft}^3$$

$$\frac{0.561(10^6)}{.08063(60)(24)(365)} = 13.2 \text{ years for complete replacement of the recoverable oil.}$$

Since three barrels per day of water accompanied the oil in the original depleted field's flow, water was also reinjected in this amount in the lowest point in the oil formation. 500 ppm of both a surfactant and a polymer were added to aid in the water's flushing of trapped oil in the lower section of the reservoir.

EXAMPLE D

Figure 2A:
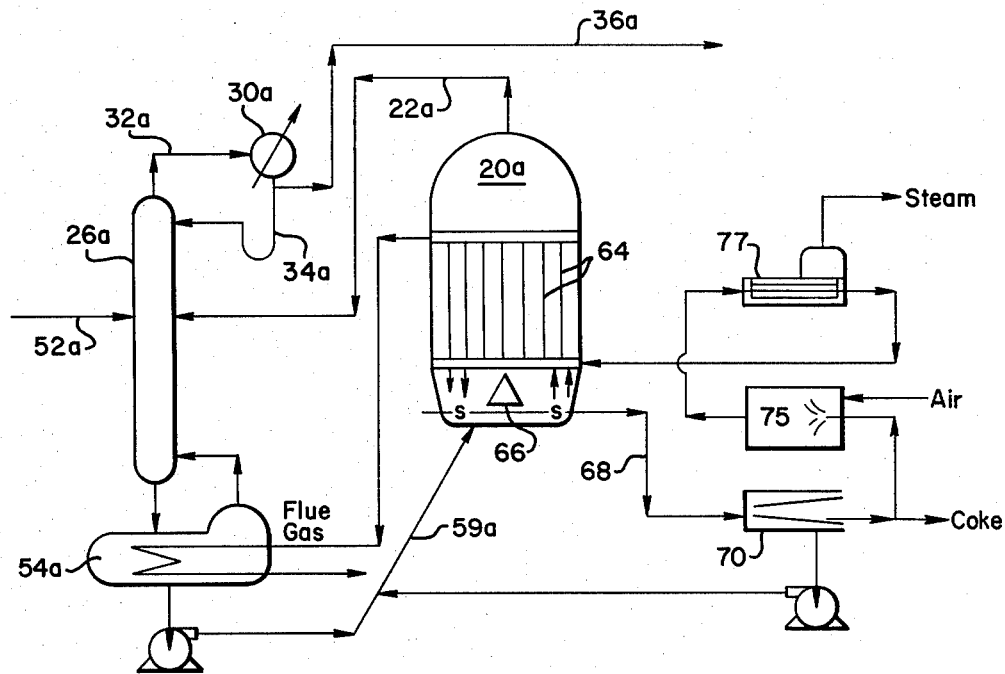
Figures 2B, 2C, 2D:
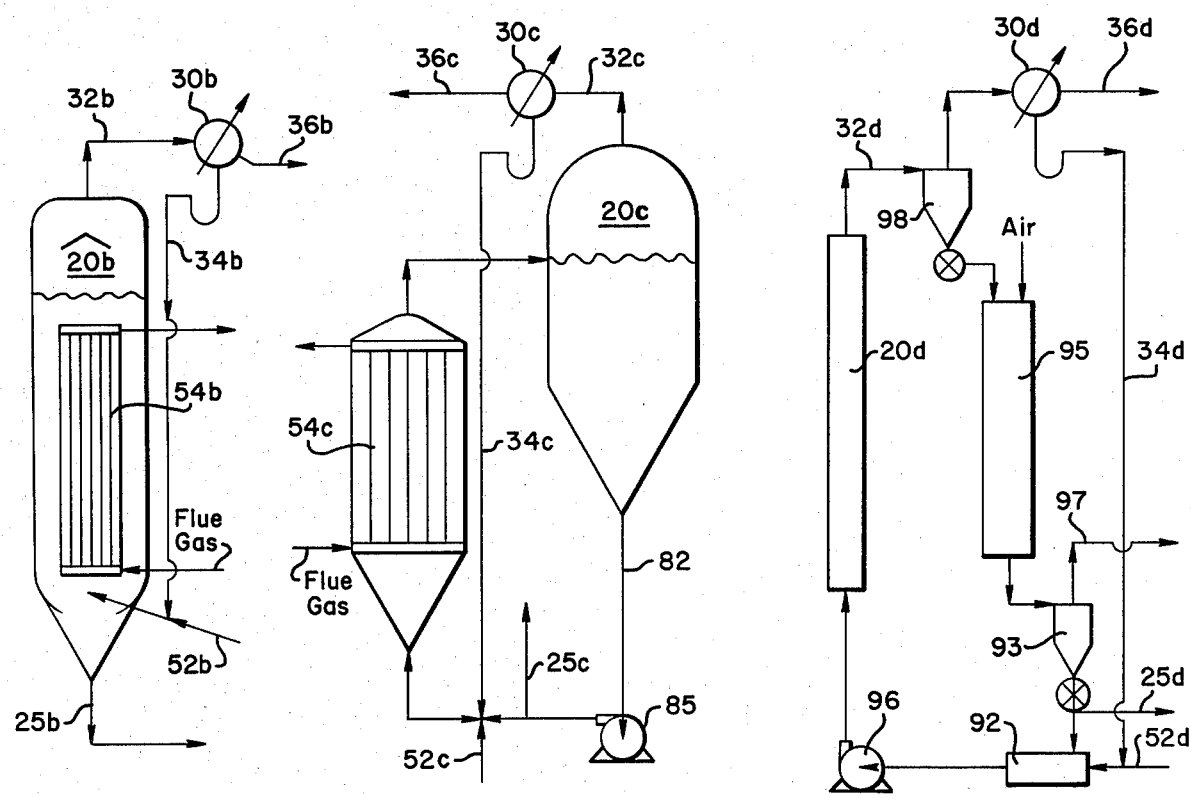

A thermal cracker of the type shown in FIG. 2c was used to crack Sespe crude oil. The cracker operates at 950° F. and 500 psia. Kerosene and heavier materials are recycled to extinction. The gasoline did not appreciably crack at these conditions. The reactor volume was such that a typical coke particle grew in size for four hours as it circulated through the reactor-heater system. The reactor recycle ratio (circulation through the heater) was kept as high as practical (15 times the feed rate) as this reduced the necessary temperature difference in the heater, and thereby the coke deposition rate. The slurry concentration was 33%, or 0.3319(8.34) (0.9141)=2.53 lb. coke/gal. The compositions in the system are shown on the following page. The coke circulation rate is 0.4875 (100) (0.3319)=16.18 lb. coke circulating-/min./lb. crude input/min.

| | Crude | | Reactor Product | | Distillation Feed | |
|---|---|---|---|---|---|---|
| | lb/min | mmol/min | lb/min | mmol/min | lb/min | mmol/min |
| $C_1$–$C_3$ | — | — | .1147 a | 3.8233 a | .1147 a | 3.8233 a |
| $C_4$ | .0038 a | .0065 a | .0254 a | .4379 a | .0292 a | .5034 a |
| Gasoline | .1667 a | 1.6670 a | .4658 a | 4.6580 a | .6325 a | 6.3250 a |
| Kerosene | .0305 a | .1763 a | — | — | .0305 a | .1763 a |
| Gas Oil | .1456 a | .6442 a | — | — | .1456 a | .6442 a |
| Lube Oil | .1402 a | .4124 a | — | — | .1402 a | .4124 a |
| Residuum | .5131 a | .7126 a | — | — | .5131 a | .7126 a |
| Total | .9999 a | 3.6780 a | .6059 a | 8.9192 a | 1.6058 a | 12.5972 a |
| Carbon | | | .3319 a | | | |
| Total | | | .9378 a | | | |

| | Bottoms Product | | Distillation Overhead Vapor Product | | Distillation Overhead Liquid Product (Condensed) | |
|---|---|---|---|---|---|---|
| | lb/min | mmol/min | lb/min | mmol/min | lb/min | mmol/min |
| $C_1$–$C_3$ | — | — | .0991 a | 3.3043 a | .0156 a | .5190 a |
| $C_4$ | — | — | .0139 a | .2390 a | .0153 a | .2644 a |
| Gasoline | .1184 a | 1.1840 a | .0458 a | .4576 a | .4683 a | 4.6834 a |
| Kerosene | .0205 a | .1185 a | .0001 a | .0003 a | .0099 a | .0575 a |
| Gas Oil | .1456 a | .6442 a | — | — | — | — |
| Lube Oil | .1402 a | .4124 a | — | — | — | — |
| Residuum | .5131 a | .7126 a | — | — | — | — |
| Total | .9378 a | 3.0717 a | .1589 a | 4.0012 a | .5091 a | 5.5243 a |

EQUIPMENT

Normal oil refinery crude oil cracking equipment is highly sophisticated, very large, and complex to operate. It runs at low (e.g. 5–50 psig) pressure, and has a strong design basis toward producing middle distillate (gasoline) products at very large capacity, such as rates of 10,000–100,000 barrels per day. Such features are the opposite of what is required for carrying out the present invention where preferably pressures of 200–2000 psig are utilized in field equipment operating at about 2 to 1000 barrels per day to produce high quantities of light hydrocarbons.

With reference to FIG. 1, an illustrative embodiment whereby the aforementioned separation means (26) comprises a distillation column is hereafter described. Crude oil from wells (2) or (6) is pumped to the desired operating pressure at pump (10) and then flowed through a preheater (not shown), optionally as counterflow in the cracker overhead condenser, and into the distillation column through line (52) where its light ends are boiled off (this would include any short-circuited injected hydrocarbons from the formation). These light ends are joined by the overhead vapors from the cracker and flow through line (32) to a partial condenser (30) which returns the heavier ends to the distillation column through line (34). The injection range hydrocarbons are either condensed and injected through line (36) to the formation or split into light and medium distillate products for further refining as desired. Gases not removed by phase separator (14) may be withdrawn from the condenser and removed from the system, or injected with the condensate. Similarly, product may be withdrawn from the mid-range condensate, or it may be also injected.

Underflow from the distillation column is heated with reboiler (54) producing vapor to be sent back into the column through line (56). Hydrocarbons not vaporized in the reboiler are returned to the cracker by pump (58) through line (59). The reboiler and vapor lines are shown in phantom since such may not be necessary when the separation means (26) is not a distillation column as described above, but rather a partial condenser, phase separator, heat exchanger or a combination of the above depending upon the crude oil being processed and the operating conditions. It will be understood, however, that with the preferred operating pressures of 200–2000 psig, some type of heating means will be required to effect the hydrocarbon separations described above.

An example of a preferred cracker is one that circulates a 5 to 35 volume percent slurry of coke with the oil through tubes that are heated with hot flue gas or by direct firing. The quantity of coke is equivalent to from one to four hours residence time, and the temperature difference across the tubes will be as low as possible (i.e. preferably less than 100° F.) and closely controlled. The novel cracker can work with thermosyphon or boiling-induced circulation, but preferably will operate with a positive circulation rate of four to fifteen ft/sec through the tubes. The unit will basically work as a growth-controlled crystallizer so that the coke particles are uniform and the tube fouling minimal. It functions best where the middle-to-light distillates are not returned to the cracker, since it is desired for the cracker temperatures to not be high, and preferably below the cracking range of such distillates.

Other novel cracking and separation systems for field operation contemplated as coming within the scope of the invention described above are shown in FIGS. 2a–2d. In FIG. 2a crude oil feed after suitable heat exchange (such as counterflow in condenser (30a)) enters the distillation column (26a) where its light ends, and those from the cracker (20a) are taken overhead through line (32a)). They are partially (or totally) condensed in condenser (30a) and leave through line (36a) as injection products. The column underflow goes to a reboiler (54a) and thence through line (59a) to the cracker (20a) where it joins a large circulating coke slurry stream shown by arrows S sending slurry through the heater tubes (64) by means of a pump (66). The excess coke is withdrawn through line (68), settled or centrifuged at (70) and optionally directly burned at (75). Flue gas from the burner heats the oil in the cracker and reboiler and can also be used to raise steam in water boiler (77). It may also preheat combustion air (now shown).

A less complicated cracker design is shown in FIG. 2b where rising film boiling or a thermosyphon alone is used for the coke slurry circulation. Generally higher temperatures will be necessary and char will be withdrawn only as required to maintain a heavy circulating slurry density. For this simpler cracker, the withdrawn slurry would generally be sent to the burner directly, and not centrifuged. Heavy distillates could be circulated if desired, but may also be withdrawn as necessary.

Referring now to FIG. 2b, crude oil in line (52b) is combined with return condensate in line (34b) to form a feed stream entering cracker (20b). The cracker is equipped with internal heater (54b) to heat and cause circulation of the coke slurry contained therein by rising film boiling or thermosyphon. This heater may also be placed external to the cracker vessel (20b). Overhead vapors flow through line (32b) to condenser (30b). Cracked products are taken from the condenser through line (36b) for further processing or are injected directly into the formation. Excess coke and heavy distillates from the cracker are removed as necessary through line (25b).

The cracker of FIG. 2b can be modified as shown in FIG. 2c by locating the heater outside the coke slurry holding and flashing vessel to allow greater convenience for access, larger surface area for heating, and possible placement of the heater tubes in the radiant section of the fire box. In this embodiment, the slurry is taken from vessel (20c) through line (82) to pump (85) and circulated through external heater (54c) back to the vessel. Crude oil feed enters the system through line (52c) and excess coke and heavy distillates are removed through line (25c). Overhead (32c) from the cracker is condensed in condenser (30c) whereby injection products are obtained in line (36c) and return condensate joins the circulating oil stream through line (34c).

For very heavy crude or residual oils, the system of FIG. 2d may be preferable whereby heating is supplied by fluidizing or entraining hot coke particles. The crude oil feed through line (52d) is combined with return condensate in line (34d) and coke slurry in mixer (92) and transported to cracker (20d) with pump (96). Alternately, the oil can be sprayed directly into the reactor (20d) along with the hot coke particles. The heterogenous cracker overhead flows through line (32d) to separator (98) whereby the coke particles are removed for burning in chamber (95) and the vapors are transported to partial condenser (30d). In this manner the return condensate flows through line (34d) back into the feed line (52d) and the cracked products are removed through line (36d). The hot coke particles from chamber (95) are removed from combustion flue gas (97) in separator (93) for remixing with the feed streams. Excess coke is removed through line (25d).

Heat for the above-described systems should preferably come from the coke (except for the crudes where the coke is more valuable than the oil). This can be either a centrifuged product or a thick slurry, although equipment should be established to burn crude oil initially and interchangeably. Flue gas should then be used for all of the primary heating in the cracker units. Steam may be produced for direct steam driven equipment, or for running electric turbines. The exhaust steam can be used for reboilers on the distillation columns. In this way the unit may be energy self sufficient requiring only crude oil to operate.

As a further improvement to this invention for fields where there is an aquifer connected to the formation, and/or part of the field is flooded with water, water injection may be practiced at the base of the formation. This can be the same water withdrawn with the oil, or other make-up water. Additives of any known type can be used to improve the oil displacement. However, since field processing equipment is available, a partial oxidation of some of the oil to produce oxygenated or water miscible compounds, and have these materials injected with the water, could lead to advantageous water stripping yields. Preferably such water injection should be done with the light hydrocarbons, but it could also be practiced alone.

It will be understood that the above examples and descriptions of preferred embodiments should not be construed to limit the scope of the present invention since it is clear to those skilled in the art that other modifications and improvements may be made without departing from the scope of the invention. Accordingly, the invention is to be limited only by the scope of the appended claims.

I claim:

1. A method of oil recovery comprising:
   providing a field oil cracking unit near an oil formation having one or more wells, said cracking unit adapted to produce light and intermediate hydrocarbons at pressures for direct injection into the oil formation;
   said cracking unit comprising a cracker connected to said wells for cracking oil, said cracker including an overhead condensing means for separating said light from the intermediate or heavier hydrocarbons;
   said cracker comprising a thermal cracking device for small scale, high pressure hydrocarbon liquid phase cracking from a slurry having a high coke density employing the characteristics of a growth-type crystallizer;
   said device including a cracker chamber having an effective volume to provide a high liquid residence time per pass and a long coke residence time;
   heating means including heater tubes through which said slurry passes;
   means to circulate said slurry through said tubes whereby a low temperature differential between said slurry and tubes will be maintained to minimize fouling and control coking;
   contacting oil in said formation with the light and intermediate hydrocarbons by injecting said hydrocarbons into the formation through at least one of said wells; and
   displacing said oil in the formation with said hydrocarbons and causing flow of the oil to at least one of said wells.

2. The method of claim 1 wherein said light hydrocarbons contain predominately one to four carbon atoms and said intermediate hydrocarbons contain predominately four to ten carbon atoms.

3. The method of claim 2 wherein a major portion of said light hydrocarbons comprise propane and butane and a lesser portion comprise a mixture of methane and ethane.

4. The method of claim 3 wherein said light or a mixture of light and intermediate hydrocarbons are injected as gases which become at least partially condensed in the formation.

5. The method of claim 1 including a distillation means adapted to receive oil from said wells and separate said oil into at least an overhead fraction and underflow fraction, said overhead fraction being transported to said condensing means and said underflow being transported to said cracker.

6. The method of claim 5 wherein water and entrained gases are removed from said oil prior to entering said distillation means.

7. The method of claim 1 wherein said wells comprise one or more production wells interspersed with one or more injection wells in a pattern to insure the maximum recovery of oil from the formation, said production wells being convertible to injection wells and vice versa.

8. The method of claim 1 wherein said intermediate hydrocarbons are injected into the middle or lower portion of said formation and said light hydrocarbons are injected into the upper portion thereof.

9. The method of claim 8 wherein said wells comprise one or more wells adapted to inject hydrocarbons into said upper portion of the formation and water into said lower portion of the formation.

10. A method of withdrawing oil from an underground oil-bearing strata penetrated by wells comprising the steps of
    providing field cracking equipment near said strata adapted to receive and convert oil feed to light hydrocarbons at pressures such that they may be injected into the existing strata;
    diluting the crude oil in said strata with said hydrocarbons;
    displacing the diluted crude oil with said hydrocarbons at sufficient pressure to cause said diluted crude oil to flow from said strata into withdrawal wells;
    said field cracking equipment including a cracker connected by an overhed line to a separation means for separating the light hydrocarbons from other hydrocarbons, said light hydrocarbons containing predominantly one to eight carbon atoms;
    said cracker comprising a thermal cracking device for small scale, high pressure hydrocarbon liquid phase cracking from a slurry having a high coke density employing the characteristics of a growth-type crystallizer;
    said device including a cracker chamber having an effective volume to provide a high liquid residence time per pass and a long coke residence time;
    heating means including heater tubes through which said slurry passes; and,
    means to circulate said slurry through said tubes whereby a low temperature differential between said slurry and tubes will be maintained to minimize fouling and control coking.

11. The method of claim 10 wherein said separation means comprises a condenser for condensing and separating predetermined portions of vapor overhead from said cracker.

12. The method of claim 11 wherein said separation means further includes one or more distillation columns connected to said cracker overhead line.

13. The method of claim 10 wherein said cracker includes means to circulate a 5-30 volume percent coke slurry, said means comprising a pumping means, rising film boiling means or thermosyphon means.

14. The method of claim 10 wherein said field cracking equipment includes means to pressurize said oil feed to a pressure between about 200-2000 psig.

15. The method of claim 10 wherein said other hydrocarbons having predominantly four to ten carbon atoms are injected into portions of said strata containing heavy oil having an API gravity of less than about 20 to diminish the viscosity of said heavy oil.

16. The method of claim 10 wherein the upper portion of said strata is penetrated with at least one injection well located proximate said withdrawal wells, said injection well in communication with said cracker unit for transporting said hydrocarbons into contact with the oil.

17. The method of claims 1 or 10 where the hydrocarbons for injection are totally or partially condensed so that their hydrostatic head in the wells will add to the injection pressure.

18. The method of claims 1 or 10 in which water is injected into the base of the formation to aid in causing the flow of oil to said wells.

19. The method of claim 18 in which additives selected from the group consisting of surface active agents, viscosity increasing agents and oil-water miscible solvents are added to said water.

20. The method of claim 19 in which a portion of the crude oil is partially oxidized to produce water-soluble compounds for injection.

21. The method of claims 1 or 10 wherein said heater tubes are located inside said chamber and the slurry is circulated by means selected from the group consisting of pump, vapor lift, or thermosyphon.

22. The method of claims 1 or 10 wherein said heater tubes are located outside said chamber and the slurry circulation means comprises a pump circulating said slurry at about 3 to 20 feet per second.

23. The method of claim 22 wherein excessive coke is removed from said slurry as necessary to maintain a concentration of about 5–35 weight percent coke.

\* \* \* \* \*